United States Patent
Tezawa

(10) Patent No.: US 9,770,779 B2
(45) Date of Patent: Sep. 26, 2017

(54) TIP DRESSING CUTTER

(71) Applicant: Kyokutoh Co., Ltd., Aichi (JP)

(72) Inventor: Kazuhiro Tezawa, Aichi (JP)

(73) Assignee: Kyokutoh Co., LTD., Nagoya (JP)

( * ) Notice: Subject to any disclaimer, the term of this patent is extended or adjusted under 35 U.S.C. 154(b) by 37 days.

(21) Appl. No.: 14/708,416

(22) Filed: May 11, 2015

(65) Prior Publication Data

US 2016/0089747 A1    Mar. 31, 2016

Related U.S. Application Data

(63) Continuation of application No. PCT/JP2014/005006, filed on Sep. 30, 2014.

(51) Int. Cl.
| | | |
|---|---|---|
| *B23K 11/30* | (2006.01) | |
| *B23B 5/16* | (2006.01) | |
| *B23B 27/16* | (2006.01) | |

(52) U.S. Cl.
CPC .......... *B23K 11/3063* (2013.01); *B23B 5/166* (2013.01); *B23B 27/1629* (2013.01); *B23B 2270/30* (2013.01)

(58) Field of Classification Search
CPC . B23B 2270/30; B23B 27/1629; B23B 5/166; B23K 11/3063; B23C 3/12; B23C 3/122
See application file for complete search history.

(56) References Cited

U.S. PATENT DOCUMENTS

| | | | | |
|---|---|---|---|---|
| 4,954,687 A | * | 9/1990 | Bush | B23K 11/3018 219/119 |
| 5,725,340 A | * | 3/1998 | Nakajima | B23B 5/166 407/42 |
| 7,192,227 B2 | * | 3/2007 | Nordstrom | B23B 5/166 407/113 |
| 7,789,600 B2 | * | 9/2010 | Goto | B23K 11/3063 407/42 |
| 8,899,888 B2 | * | 12/2014 | Nakajima | B23K 11/30 407/42 |

(Continued)

FOREIGN PATENT DOCUMENTS

| | | | |
|---|---|---|---|
| JP | 53-150828 U | 5/1952 | |
| WO | WO 2013/061710 A1 | 2/2013 | |

OTHER PUBLICATIONS

Extended European Search Report dated Nov. 17, 2015 for corresponding European Application No. 14838906.7.

(Continued)

*Primary Examiner* — Sara Addisu
(74) *Attorney, Agent, or Firm* — Renner Otto Boisselle & Sklar, LLP

(57) ABSTRACT

A low-cost tip dressing cutter causing no accumulation of swarf around a breaker is provided. A surface of a breaker 5 facing a cutting plate 4 corresponds to a recessed surface 52. The diameter of the recessed surface 52 gradually decreases with increasing distance from the outer periphery of the recessed surface 52 facing the cutting plate 4 in a direction opposite to the cutting plate 4. A through hole 51 is formed at the center of the breaker 5. A screw 6 inserted through the through hole 51 is screwed to a fastening hole 33*a* of a holder 3 to attach the cutting plate 4 to the breaker 5.

4 Claims, 3 Drawing Sheets

(56) References Cited

U.S. PATENT DOCUMENTS

| | | | | |
|---|---|---|---|---|
| 8,920,218 | B2* | 12/2014 | Moision | B23K 35/40 |
| | | | | 451/443 |
| 9,517,527 | B2* | 12/2016 | Moision | B23B 5/166 |
| 2008/0078749 | A1* | 4/2008 | Sigler | B23B 5/166 |
| | | | | 219/119 |
| 2009/0035074 | A1 | 2/2009 | Craig et al. | |
| 2010/0143061 | A1 | 6/2010 | Decker et al. | |
| 2011/0266260 | A1* | 11/2011 | Sigler | B23K 11/115 |
| | | | | 219/91.2 |
| 2012/0093593 | A1 | 4/2012 | Lutz | |
| 2012/0126471 | A1* | 5/2012 | Park | B23B 5/166 |
| | | | | 269/285 |
| 2014/0064863 | A1* | 3/2014 | Nakajima | B23K 11/30 |
| | | | | 407/42 |
| 2016/0279733 | A1* | 9/2016 | Nakajima | B23K 11/3063 |

OTHER PUBLICATIONS

International Search Report for corresponding International Application No. PCT/JP2014/005006 dated Sep. 9, 2014.
Form PCT/ISA/237 for corresponding International Application No. PCT/JP2014/005006 dated Dec. 22, 2014.

* cited by examiner

TIP DRESSING CUTTER

CROSS-REFERENCE TO RELATED APPLICATIONS

This is a continuation of International Application No. PCT/JP2014/005006 filed on Sep. 30, 2014. The entire disclosure of this application is incorporated by reference herein.

BACKGROUND

The present disclosure relates to tip dressing cutters for cutting distal ends of electrode tips for spot welding.

In general, a distal end of an electrode tip used for spot welding wears due to welding performed a predetermined number of times, or the condition of the distal end deteriorates due to an oxide film, etc. sticking onto the distal end. Therefore, the distal end has to be periodically cut by using a tip dresser.

Swarf which is produced at the time of cutting the distal end of the electrode tip by a cutting blade of the tip dresser may come into contact with the distal end of the electrode tip and scratch the distal end, or may twine around the tip dresser. Therefore, directly after a piece of swarf is produced by cutting the distal end by a component called a breaker, the piece of swarf is bent and curled (or fractured).

For example, International Patent Publication No. WO2013/061710 describes a tip dressing cutter including a holder which has a rotation axis extending in a vertical direction and has a substantially C shape when viewed in plan. The holder has a cutout recess formed therein. The cutout recess opens laterally outward and extends in the vertical direction to open both upward and downward. Part of the inner side surface of the cutout recess is formed as a mounting surface. The mounting surface extends along the longitudinal direction of the holder. The holder has a pair of curved surfaces as upper and lower surfaces. Each curved surface has a diameter gradually decreasing with decreasing distance to a center section of the holder. The shape of each curved surface corresponds to the shape of a distal end of an associated one of electrode tips when the center axes of the electrode tips coincide with the rotation axis of the holder. A cutting plate can be attached to the mounting surface. The cutting plate has a pair of cutting blades each corresponding to the shape of an associated one of the curved surfaces. The cutting plate and the breaker are fastened together to the mounting surface by a screw. The holder is turned with the distal ends of the electrode tips each being received by a corresponding one of the curved surfaces, thereby cutting the distal ends of the electrode tips by the cutting blades of the cutting plate, while pieces of swarf produced by cutting the distal ends by the cutting blades are bent by the breaker.

SUMMARY

When a gap is formed between the cutting plate and the breaker which are fastened together to the mounting surface, the pieces of swarf produced by cutting the distal ends by the cutting blades are caught in the gap, which causes a large amount of swarf accumulated around the breaker to prevent the functioning of the breaker.

In order to avoid the problem, a surface of the cutting plate and a surface of the breaker which face each other may be precisely finished, but this increases machining costs.

It is therefore an object of the present disclosure to provide a low-cost tip dressing cutter capable of ensuring the functioning of a breaker without accumulation of swarf around the breaker.

To achieve the object, the present invention is characterized by devising the shape of a breaker.

Specifically, the present disclosure is directed to a tip dressing cutter including: a rotator having a tip receiving portion configured to receive a distal end of an electrode tip for spot welding; a cutting plate configured to cut the distal end of the electrode tip when the rotator is turned with the cutting plate being attached to the rotator and with the distal end of the electrode tip being received by the tip receiving portion; and a breaker attached to a plane of the cutting plate and guiding a piece of swarf ejected by cutting the electrode tip by the cutting plate so that the piece of swarf is bent in a predetermined direction. The present disclosure has provided the tip dressing cutter with the following features.

That is, according to a first aspect of the disclosure, the breaker has a recessed surface facing the cutting plate and having a diameter gradually decreasing with increasing distance from an outer periphery of the recessed surface facing the cutting plate in a direction opposite to the cutting plate, and a through hole through which a screw is insertable and which opens to the recessed surface. The breaker is configured to be attached to the cutting plate with the recessed surface being in close contact with the plane of the cutting plate, by screwing the screw inserted through the through hole into at least one of the rotator or the cutting plate.

In a second aspect of the disclosure, the breaker of the first aspect of the disclosure has a ring shape at a center position of which the through hole is formed.

In a third aspect of the disclosure, the breaker of the first aspect of the disclosure has an outer peripheral portion provided with an inclined plane having a diameter gradually decreasing with increasing distance from the cutting plate.

In a fourth aspect of the disclosure, a countersunk hole is formed around the through hole in a surface of the breaker opposite to the cutting plate of the third aspect of the disclosure, the screw has a head surface having a diameter gradually decreasing in a direction opposite to a fastening direction, and the countersunk hole has a depth which allows the inclined plane to be flush with the head surface of the screw when the breaker is attached to the cutting plate.

According to the first aspect of the disclosure, when the breaker is set at a mounting position of the cutting plate, the recessed surface of the breaker forms a space between a portion of the breaker around the through hole and the cutting plate. Therefore, when a screw is inserted through the through hole and the breaker is fastened to the cutting plate or the rotator by the screw, the portion of the breaker around the through hole warps toward the cutting plate due to the fastening force of the screw. At this time, a reaction of the warp of the portion around the through hole toward the cutting plate generates force toward the cutting plate at the outer periphery of the breaker. Thus, the outer periphery of the breaker is pressed against the cutting plate, so that a gap between the outer periphery of the breaker and the cutting plate disappears. Thus, no swarf is caught between the cutting plate and the breaker, so that the functioning of the breaker can be ensured.

According to the second aspect of the disclosure, the distance from the through hole to the outer periphery of the breaker is uniform. Therefore, when the portion of the breaker around the through hole warps toward the cutting plate due to the fastening force of the screw, force from the outer periphery of the breaker toward the cutting plate is uniform in the periphery of the breaker. Thus, formation of a gap between the cutting plate and the outer periphery of the breaker due to nonuniform force from the outer periphery of the breaker to the cutting plate can be prevented.

According to the third aspect of the disclosure, a piece of swarf produced by cutting the distal end by the cutting blade is gently bent due to the inclination of the inclined plane. Therefore, a bend in the piece of swarf at an acute angle which causes the piece of swarf to be in contact with the distal end of the electrode tip after the cutting is prevented, so that a cut area of the electrode tip can be kept clean.

In the fourth aspect of the disclosure, no step is formed between the inclined plane and the head of the screw. Therefore, after the piece of swarf produced by cutting the distal end by the cutting blade is guided to the inclined plane, the piece of swarf smoothly goes over the head of the screw. This can ensure avoidance of contact of the piece of swarf with the cut distal end of the electrode tip caused by a change in moving direction of the piece of swarf toward the electrode tip due to the head of the screw.

DETAILED DESCRIPTION

Embodiments of the present disclosure will be described in detail below based on the drawings. The following preferred embodiments are set forth merely for the purpose of examples in nature.

Figure 1:
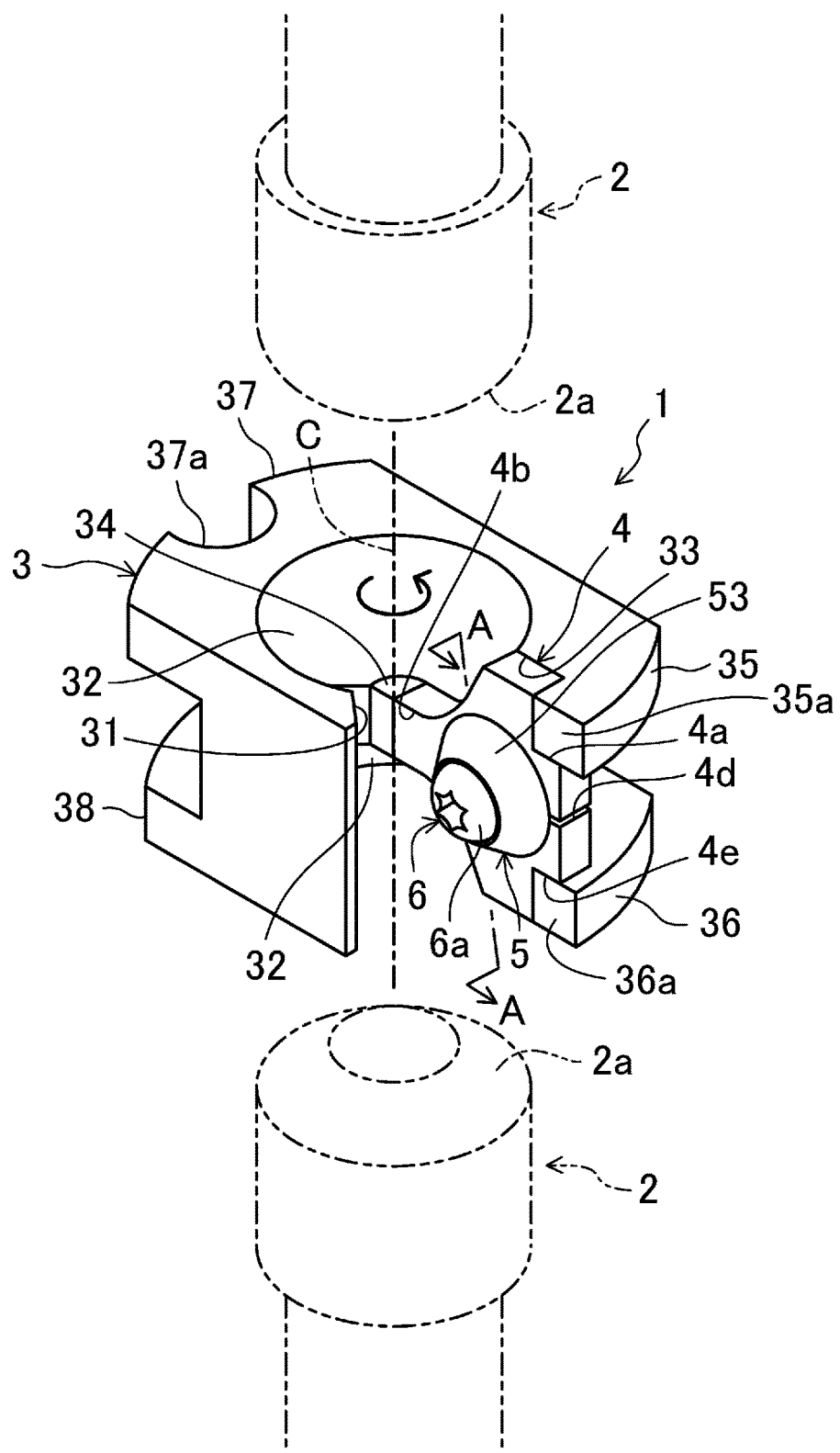
FIG. 1 is a perspective view illustrating a cutter according to an embodiment of the present disclosure.
Figure 2:
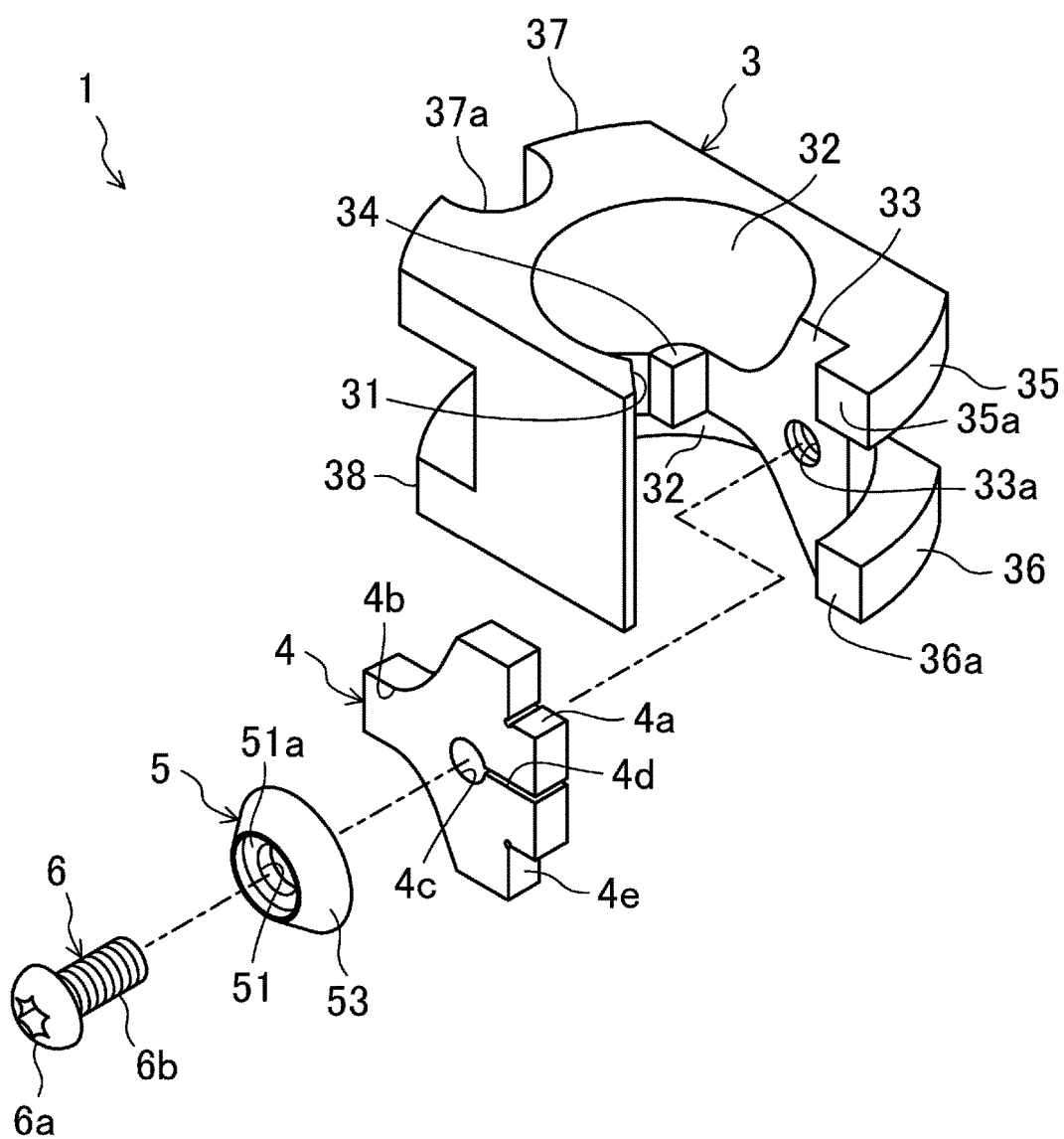
FIG. 2 is an exploded perspective view illustrating the cutter according to the embodiment of the present disclosure.

FIGS. 1 and 2 show a cutter 1 according to an embodiment of the present disclosure. The cutter 1 is attached to a tip dresser described in, for example, International Patent Publication No. WO2013/061710, in order to cut distal ends 2a of electrode tips 2 for spot welding.

The cutter 1 is wide and substantially C-shaped when viewed in plan and includes a metal holder 3 (rotator) having a vertically short columnar shape. The holder 3 is turned around a rotation axis C extending in the vertical direction at a center position of the holder 3 by rotation of a drive motor (not shown).

A cutout recess 31 is formed in one longitudinal portion of the holder 3. The cutout recess 31 is opens laterally outward and extends in the vertical direction to open both upward and downward. The cutout recess 31 is a substantially fan-shaped cutout when viewed in plan.

The holder 3 has a pair of curved surfaces 32 (tip receiving portions) as upper and lower surfaces. Each curved surface 32 has a diameter decreasing with decreasing distance to the center position of the holder 3.

The shape of each curved surface 32 corresponds to the shape of an associated one of the distal ends 2a of the electrode tips 2 when the center axes of the electrode tips 2 coincide with the rotation axis C of the holder 3, so that each curved surface 32 can receive the associated one of the distal ends 2a.

As illustrated in FIG. 2, part of an inner side surface of the cutout recess 31 is formed as a mounting surface 33. The mounting surface 33 extends along the longitudinal direction of the holder 3. The mounting surface 33 has a substantially triangular shape in side view.

A fastening hole 33a is formed at the center of the mounting surface 33. An inner circumferential surface of the fastening hole 33a has a female thread.

A first positioning projection 34 having a block shape protrudes from a side of the mounting surface 33 facing the rotation axis C.

An upper extending portion 35 and a lower extending portion 36 which extend laterally outward are respectively provided at an upper edge and a lower edge of the one longitudinal portion of the holder 3.

A portion of the upper extending portion 35 facing the mounting surface 33 protrudes beyond the mounting surface 33, and the protruding portion is a second positioning projection 35a.

A portion of the lower extending portion 36 facing the mounting surface 33 also protrudes beyond the mounting surface 33 to correspond to the second positioning projection 35a, and the protruding portion is a third positioning projection 36a.

On the other hand, an upper protruding portion 37 and a lower protruding portion 38 are respectively provided at an upper edge and a lower edge of the other longitudinal portion of the holder 3. The upper protruding portion 37 and the lower protruding portion 38 protrude laterally outward and extend in a horizontal direction crossing the longitudinal direction of the holder 3. A semicircular recess 37a which opens laterally outward is formed at a midway position of the upper protruding portion 37.

A substantially triangular metal cutting plate 4 for cutting the distal ends 2a of the electrode tips 2 can be attached to the mounting surface 33 with the thickness direction of the cutting plate 4 oriented in the horizontal direction.

Positioning recesses 4a and 4e each of which is a rectangular cutout in side view are respectively formed at an upper portion and a lower portion of one longitudinal portion of the cutting plate 4.

On the other hand, cutting blades 4b are provided at an upper edge and a lower edge of the other longitudinal portion of the cutting plate 4. Each cutting blade 4b has a curved shape corresponding to an associated one of the curved surfaces 32 when the cutting plate 4 is attached to the mounting surface 33.

A mounting hole 4c is formed at the center of the cutting plate 4 to pass through the cutting plate 4. A slit 4d is formed in the one longitudinal portion of the cutting plate 4. The slit 4d extends from the mounting hole 4c in the horizontal direction and is open at one longitudinal edge of the cutting plate 4.

The other longitudinal edge of the cutting plate 4 is placed on the first positioning projection 34, the second positioning projection 35a is fitted into the positioning recess 4a, and the third positioning projection 36a is fitted into the positioning recess 4e. In this way, the cutting plate 4 is positioned with respect to the mounting surface 33, so that the mounting hole 4c corresponds to the fastening hole 33a.

A ring-shaped metal breaker 5 having a through hole 51 formed at a center position thereof is attached to a plane of the cutting plate 4 opposite to the mounting surface 33.

Figure 3:
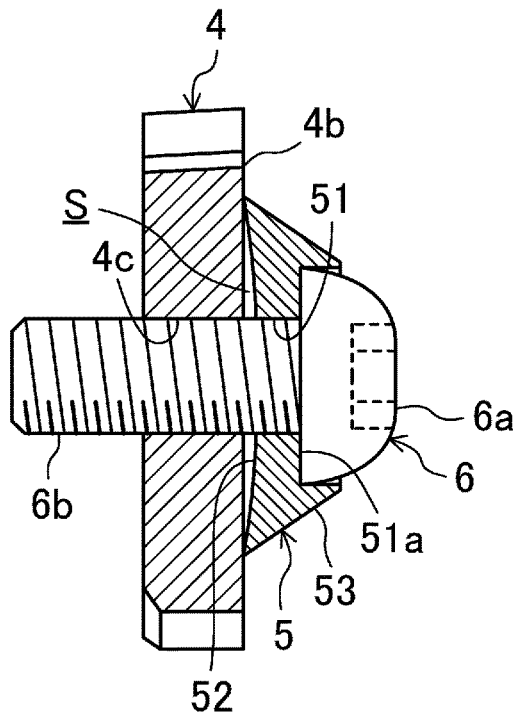
FIG. 3 is a diagram corresponding to a cross-sectional view taken along the line A-A of FIG. 1, wherein a situation immediately before a cutting plate and a breaker are attached to a cutter body is shown.

As illustrated in FIG. 3, an outer peripheral portion of the breaker 5 has an acute shape in which the thickness of the outer peripheral portion decreases with decreasing distance to an outer periphery of the breaker.

A surface of the breaker 5 facing the cutting plate 4 corresponds to a recessed surface 52 having a diameter gradually decreasing with increasing distance from an outer periphery of the surface of the breaker 5 facing the cutting plate 4 in a direction opposite to the cutting plate 4. The through hole 51 is open to the recessed surface 52.

In a surface of the breaker 5 opposite to the cutting plate 4, a countersunk hole 51a is formed around the through hole 51.

An inclined plane 53 having a diameter gradually decreasing with increasing distance from the cutting plate 4 is provided at the outer peripheral portion of the breaker 5.

The cutting plate 4 and the breaker 5 can be attached to the mounting surface 33 by a screw 6.

The screw 6 is a torx (registered trademark) screw including a head 6a and a shaft 6b whose outer circumferential surface has a male thread. A surface of the head 6a has a gently curved shape having a diameter gradually decreasing in a direction opposite to a fastening direction.

The cutting plate 4 is placed on the mounting surface 33 of the holder 3, the breaker 5 is placed on the plane of the cutting plate 4, and the shaft 6b of the screw 6 is inserted through the through hole 51 of the breaker 5 and the mounting hole 4c of the cutting plate 4 sequentially. In this state, the shaft 6b is screwed into the fastening hole 33a of the holder 3, so that a portion of the breaker 5 around the through hole 51 warps toward the cutting plate 4, and the recessed surface 52 is in close contact with the plane of the cutting plate 4. In this state, the cutting plate 4 and the breaker 5 are together screwed onto the mounting surface 33.

Figure 4:
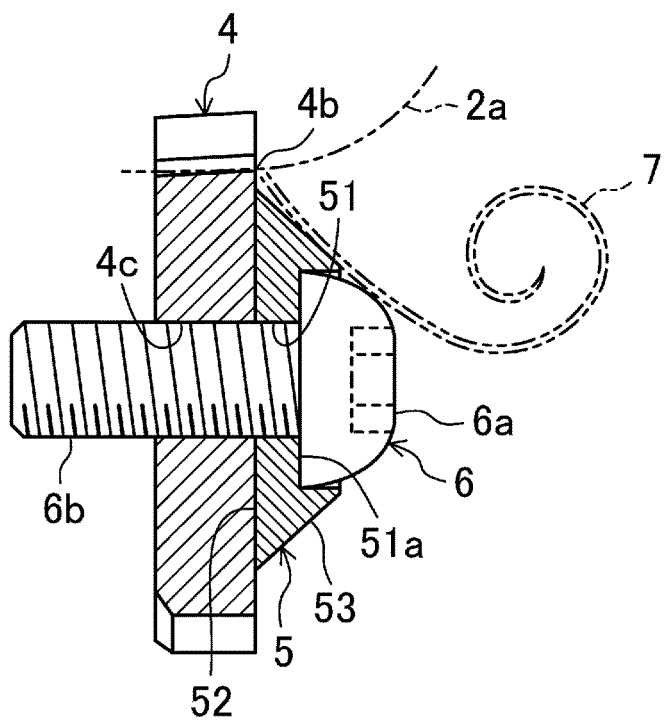
FIG. 4 is a cross-sectional view taken along the line A-A of FIG. 1.

As illustrated in FIG. 4, the countersunk hole 51a has a depth which allows the inclined plane 53 to be flush with the surface of the head 6a of the screw 6 when the breaker 5 is attached to the cutting plate 4.

The holder 3 is turned around the rotation axis C with the cutting plate 4 and the breaker 5 being attached to the holder 3 and with the distal ends 2a of the electrode tips 2 being received by the curved surfaces 32, thereby cutting the distal ends 2a of the electrode tips 2 by the cutting blades 4b of the cutting plate 4.

The breaker 5 guides a piece of swarf 7 ejected by cutting the distal end 2a of the electrode tip 2 by the cutting plate 4 so that the piece of swarf 7 is bent in a predetermined direction.

Next, operation of attaching the cutting plate 4 and the breaker 5 to the holder 3 will be described.

First, the cutting plate 4 is caused to correspond to the mounting surface 33 so that both of the cutting blades 4b of the cutting plate 4 face the rotation axis C of the holder 3.

Next, the other longitudinal edge of the cutting plate 4 is placed on the first positioning projection 34, and the cutting plate 4 is moved toward the mounting surface 33. In this way, the second positioning projection 35a fits into the positioning recess 4a, and the third positioning projection 36a fits into the positioning recess 4e, so that the cutting plate 4 is positioned with respect to the mounting surface 33.

Subsequently, the breaker 5 is placed on the cutting plate 4 such that the recessed surface 52 faces the plane of the cutting plate 4 opposite to the mounting surface 33 and the through hole 51 corresponds to the mounting hole 4c (the breaker 5 is set at an attachment position on the cutting plate 4). Thus, as illustrated in FIG. 3, the recessed surface 52 of the breaker 5 forms a space S between the portion of the breaker 5 around the through hole 51 and the cutting plate 4.

After that, the shaft 6b of the screw 6 is inserted through the through hole 51 of the breaker 5 and the mounting hole 4c of the cutting plate 4 sequentially, and is screwed into the fastening hole 33a of the holder 3. Thus, the portion of the breaker 5 around the through hole 51 is pressed by the head 6a due to the fastening force of the screw 6, and warps toward the cutting plate 4. Thus, the space S disappears, so that the cutting plate 4 and the breaker 5 are in close contact with each other. A reaction of the warp of the portion around the through hole 51 toward the cutting plate 4 generates force toward the cutting plate 4 at the outer periphery of the breaker 5, and the outer periphery of the breaker 5 is pressed onto the cutting plate 4, so that a gap between the outer periphery of the breaker 5 and the cutting plate 4 disappears. In this state, the cutting plate 4 and the breaker 5 are together fastened to the mounting surface 33 of the holder 3. Therefore, the swarf 7 is no longer caught between the cutting plate 4 and the breaker 5, so that the functioning of the breaker 5 can be ensured.

Since the breaker 5 has a ring shape at the center position of which the through hole 51 is formed, the distance from the through hole 51 to the outer periphery of the breaker 5 is uniform. Thus, when the portion of the breaker 5 around the through hole 51 warps toward the cutting plate 4 due to the fastening force of the screw 6, force from the outer periphery of the breaker 5 toward the cutting plate 4 is uniform around the breaker 5. Thus, formation of the gap between the cutting plate 4 and the outer periphery of the breaker 5 due to nonuniform force from the outer periphery of the breaker 5 toward the cutting plate 4 can be prevented.

Next, operation of cutting the distal ends 2a of the electrode tips 2 by the cutter 1 will be described.

First, a drive motor (not shown) of a tip dresser is rotated to turn the cutter 1 mounted to the tip dresser about the rotation axis C.

Next, one of the electrode tips 2 is moved above the cutter 1, and the other of the electrode tips 2 is moved under the cutter 1. At the same time, the center axes of the electrode tips 2 are allowed to coincide with the rotation axis C of the cutter 1.

After that, each electrode tip 2 is brought close to a corresponding one of the curved surfaces 32 of the holder 3 along the rotation axis C. In this way, each curved surface 32 receives a corresponding one of the distal ends 2a of the electrode tips 2, and each cutting blade 4b of the cutting plate 4 comes into contact with a corresponding one of the distal ends 2a of the electrode tips 2, thereby cutting the distal end 2a. At this time, as illustrated in FIG. 4 a piece of swarf 7 obtained by cutting each distal end 2a by a corresponding one of the cutting blades 4b is gently bent due to the inclination of the inclined plane 53. This prevents the piece of swarf 7 from being bent at an acute angle by the breaker 5. Thus, the piece of swarf 7 does not come into contact with the distal end 2a of the electrode tip 2 after the cutting. Therefore, the cut area of the electrode tip 2 can be kept clean.

Moreover, the countersunk hole 51a eliminates a step between the inclined plane 53 and the head 6a of the screw 6. Therefore, after the piece of swarf 7 obtained by cutting the distal end 2a by the cutting blade 4b is guided to the inclined plane 53, the piece of swarf 7 smoothly goes over the head 6a of the screw 6. This can ensure avoidance of contact of the piece of swarf 7 with the distal end 2a of the electrode tip 2 caused by a change in moving direction of the piece of swarf 7 by the head 6a of the screw 6.

Although the breaker 5 is made of metal in the embodiment of the present disclosure, the breaker 5 may be made of a resin.

In the embodiment of the present disclosure, the screw 6 is a torx screw, but any types of screws can be used as long as they can fasten the cutting plate 4 and the breaker 5 together to the mounting surface 33 of the holder 3.

According to the embodiment of the present disclosure, the shaft 6b of the screw 6 is screwed into the fastening hole 33a of the holder 3, thereby fastening the breaker 5 to the cutting plate 4. However, the shaft 6b of the screw 6 may be screwed to the cutting plate 4 to attach the breaker 5 to the cutting plate 4. The shaft 6b of the screw 6 may be screwed at least to the holder 3 or the cutting plate 4 to attach the breaker 5 to the cutting plate 4.

INDUSTRIAL APPLICABILITY

The present disclosure is suitable for tip dressing cutters used to cut distal ends of electrode tips for spot welding.

What is claimed is:

1. A tip dressing cutter comprising:
a rotator having a tip receiving portion configured to receive a distal end of an electrode tip for spot welding;
a cutting plate configured to cut the distal end of the electrode tip when the rotator is turned with the cutting plate being attached to the rotator and with the distal end of the electrode tip being received by the tip receiving portion; and
a breaker attached to a plane of the cutting plate and guiding a piece of swarf ejected by cutting the electrode tip by the cutting plate so that the piece of swarf is bent in a predetermined direction, wherein
the breaker has an outer peripheral portion with a cross section having an acute-angled shape, of which the thickness gradually decreases with decreasing distance from a center of the breaker to an outer peripheral edge of the breaker,
a surface of the breaker facing the cutting plate is a recessed surface having a shape of which the diameter gradually decreases from the outer peripheral edge of the breaker with increasing distance from the cutting plate, the recessed surface forming a space between the recessed surface itself and the cutting plate when the breaker is placed on the plane of the cutting plate,
the breaker has, at a center position thereof, a through hole through which a screw is insertable therein and which opens to the recessed surface, and
the breaker is configured to be attached to the cutting plate by screwing the screw inserted through the through hole into at least one of the rotator or the cutting plate and by allowing a portion of the breaker around the through hole to warp toward the cutting plate due to a fastening force of the screw, the breaker being configured to be attached to the cutting plate with no gap left between the outer peripheral edge of the breaker and the cutting plate by pressing the outer peripheral edge of the breaker against the cutting plate with force applied toward the cutting plate and generated at the other peripheral edge of the breaker due to a reaction of the warp of the portion around the through hole toward the cutting plate.

2. The tip dressing cutter of claim 1, wherein the breaker has a ring shape at a center position of which the through hole is formed.

3. The tip dressing cutter of claim 1, wherein the outer peripheral portion is provided with an inclined plane having a diameter gradually decreasing with increasing distance from the cutting plate.

4. The tip dressing cutter of claim 3, wherein a countersunk hole is formed around the through hole in a surface of the breaker opposite to the cutting plate, the screw has a head surface having a diameter gradually decreasing in a direction opposite to a fastening direction, and
the countersunk hole has a depth which allows the inclined plane to be flush with the head surface of the screw when the breaker is attached to the cutting plate.

* * * * *